United States Patent [19]
Gay

[11] 3,918,744
[45] Nov. 11, 1975

[54] GOOSENECK HITCH ASSEMBLY
[75] Inventor: James E. Gay, Fargo, N. Dak.
[73] Assignee: Mobility, Inc., Fargo, N. Dak.
[22] Filed: Aug. 8, 1974
[21] Appl. No.: 495,677

[52] U.S. Cl. ...... 280/415 B; 280/415 A; 280/423 R; 188/112; 280/490
[51] Int. Cl.² .......................................... B62D 53/06
[58] Field of Search ............ 280/490, 423 R, 415 A, 280/415 B; 188/112

[56] References Cited
UNITED STATES PATENTS
3,180,455   4/1965   DePuydt ............................. 188/112
3,580,608   5/1971   Grant .................................. 188/112 X
3,733,089   5/1973   Goecke et al. ..................... 280/415 A FOREIGN PATENTS OR APPLICATIONS
1,241,279   5/1967   Germany ........................... 280/490

Primary Examiner—Leo Friaglia

[57] ABSTRACT

A vertically adjustable hitch assembly connecting a vehicle to a towing unit. The hitch assembly has a pair of parallel links pivotally connected to a towing connector having an actuator for the braking system for the vehicle. An expandable and contractable control member is connected to one of the links to pivot the links to change the elevation of the towing connector.

11 Claims, 4 Drawing Figures

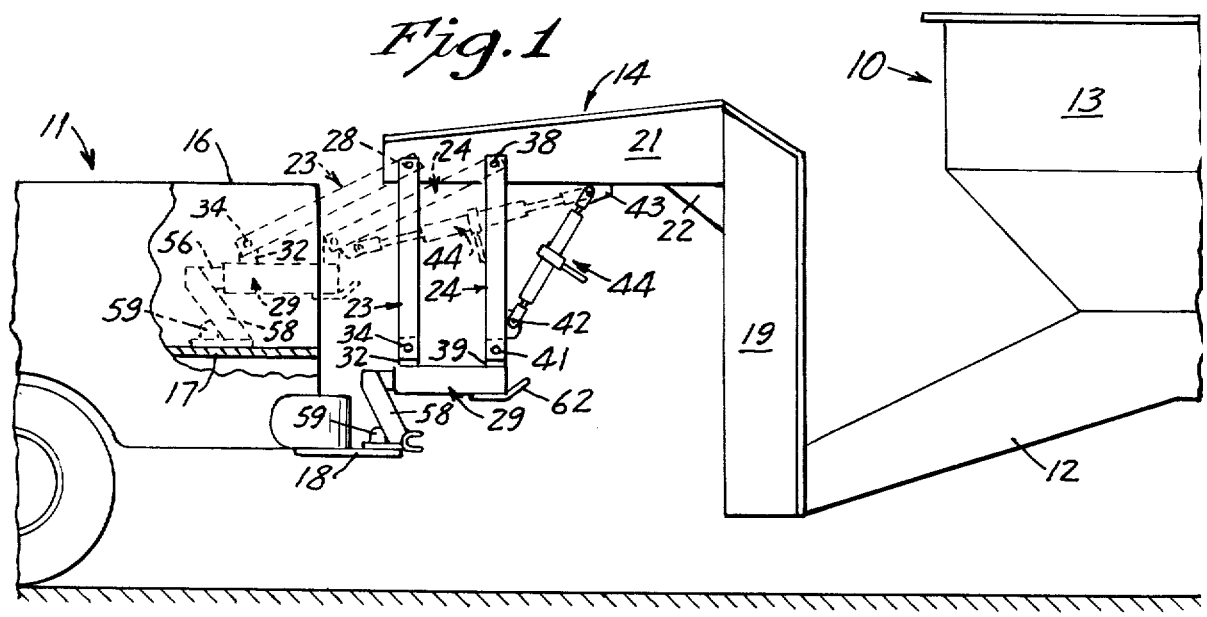
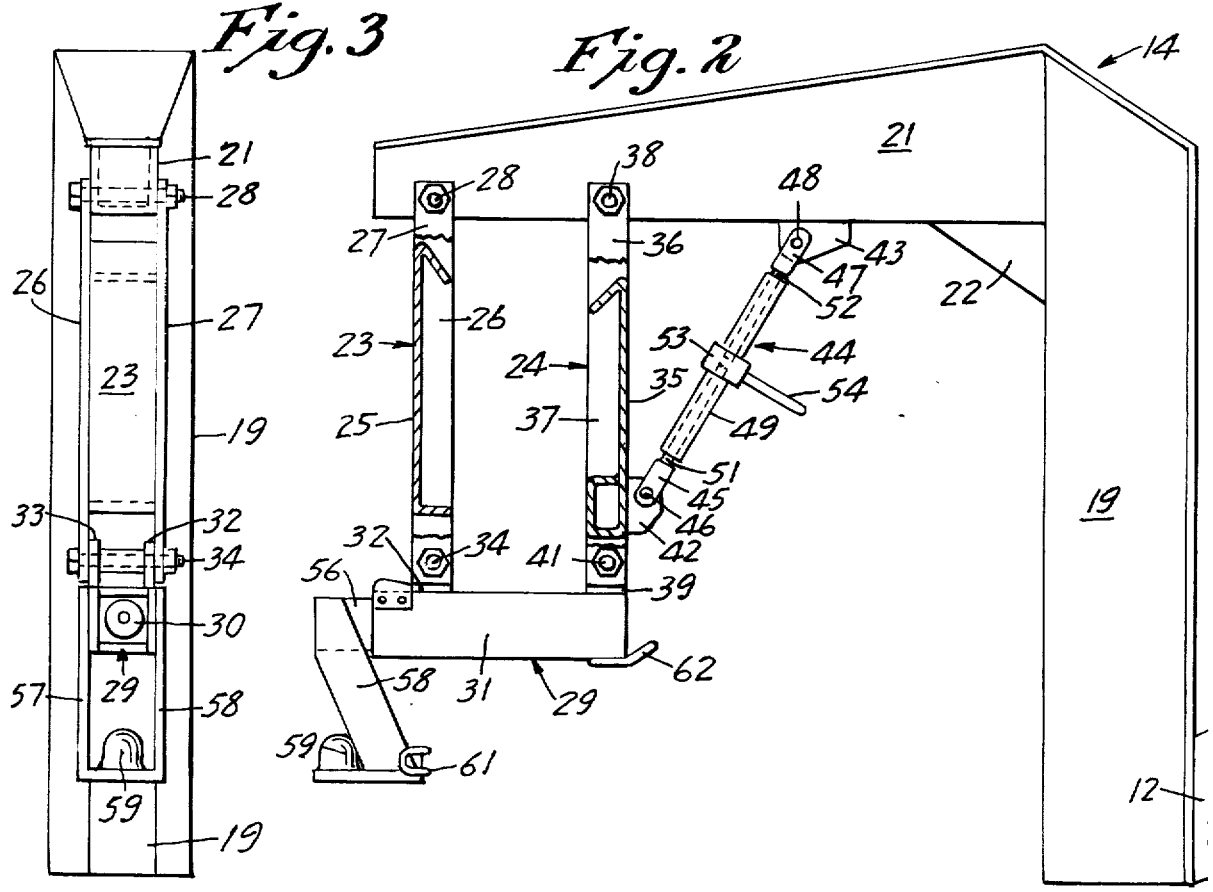
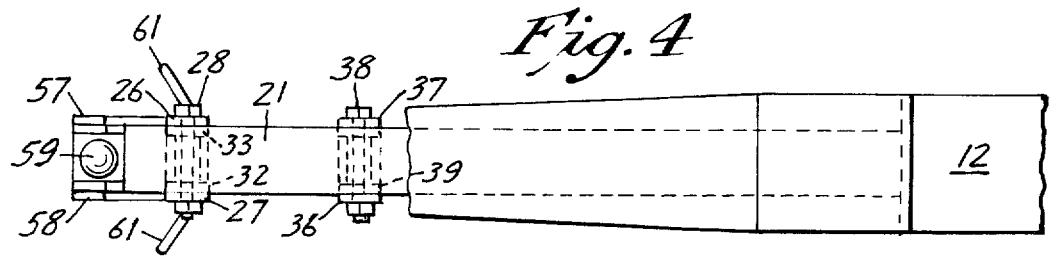

GOOSENECK HITCH ASSEMBLY

BACKGROUND OF INVENTION

Gooseneck trailers are connected to towing vehicles with hitches. These hitches are generally rigid downwardly directed structures having connectors including ball and socket members for releasably coupling the hitch to a towing vehicle such as a truck or tractor. The hitch points of different types of towing vehicles, as a pickup truck or an agricultural tractor, varies in height. The hitches are not readily adapted to the change in height so that the hitch can be quickly used on either a high elevation or a low elevation. Adjustable hitches are are shown in U.S. Pat. No. 3,527,476 and U.S. Pat. No. 3,796,444. These hitches have limited vertical adjustment and pins which must be removed and aligned with holes to affect the adjustment. This adjustment is time-consuming and does not allow for a broad range of adjustment between high and low towing positions.

SUMMARY OF INVENTION

The invention is directed to a hitch assembly for connecting an apparatus, as a vehicle, to a towing power unit, as a truck, tractor or the like. The apparatus may be a fifth wheel trailer, a self unloading wagon, a material spreader and the like. The hitch assembly has a member, as a tongue, attached to the apparatus. Means having a connector or coupling structure is adapted to be attached to the towing unit. Link means are pivotally connected to the member and the means having the connector whereby the elevation of the means having the connector can be changed. The means having the connector may be a hitch and brake actuating assembly as disclosed in U.S. Pat. No. 3,180,455. Expandable and contractable control means connected to the link means and member is operable to pivot the links thereby change the elevation of the hitch point of the connector. The control means may be members having cooperating screw threads.

An object of the invention is to provide a hitch assembly for an apparatus, as a vehicle, with a hitch coupling or connection which can be raised or lowered to accommodate high pulling structures and low pulling structures. A further object of the invention is to provide a hitch assembly which can be raised or lowered without taking the hitch apart or adding structure to the hitch. Another object of the invention is to provide a vertically adjustable hitch with a brake actuator operable in all positions of the hitch. Still another object of the invention is to provide a hitch assembly that is simple and strong in construction and easily assemblied and serviced.

IN THE DRAWINGS:

FIG. 1 is a fragmentary side elevational view of a power unit connected to a vehicle with the hitch assembly of the invention.

FIG. 2 is enlarged side elevational view, partly sectioned, of the hitch assembly FIG. 1;

FIG. 3 is a front elevational view of FIG. 2; and

FIG. 4 is a top plan view of FIG. 2.

Referring to the drawing FIG. 1 shows a vehicle such as a trailer indicated generally at 10 connected to a towing or power unit indicated generally at 11 with hitch assembly indicated generally at 14. The vehicle 10 can be a gooseneck trailer shown in U.S. Pat. No. 3,796,444, an agricultural spreader as shown in U.S. Pat. No. 3,627,376 or, flatbed trailers as shown in Pat. No. 3,220,750 and like trailers. The power unit 11 may be a pickup truck, an agricultural tractor, or similar towing vehicles. The hitch assembly 14 is connected to the frame 12 of vehicle 10 and is adjustable to change the elevation of the hitch or connection point to the power unit 11. The vehicle 10 has a body 13 mounted on the frame 12. Vehicle 10 can be any apparatus or implement which can be towed with a towing unit.

The power unit 11 shown as a pickup truck having a body 16 and a bed 17. A bumper or drawbar 18 is attached to the lower portion of the rear of body 16 and the frame supporting the body. Unit 11 can be a trailer or towing dolly.

Hitch assembly 14 has an upright member 19 attached to the forward portion of frame 12. A forwardly directed member 21 is attached to the upper end of member 19. A gusset 22 extends between and is secured to the members 19 and 21 to reinforce the members in their right angle positions shown in FIGS. 1 and 2. The member 19 and 21 are box-shape beams which provide the vehicle 10 with a gooseneck tongue. A pair of downwardly extended legs or link members indicated generally at 23 and 24 are pivotally mounted on the forward portion of member 21. Leg 23 has a pair of downwardly directed side plates 26 and 27 joined to an upright base 25. The upper ends of side plates 26 and 27 are located adjacent opposite sides of the forward member 21. The upper ends are pivotally connected to member 21 with a transverse bolt 28.

The second leg 24 is similar in construction to leg 23. Leg 24 has a pair of upright side plates 36 and 37 joined to a base or back member 35. A transverse bolt 38 pivotally connects the upper ends of side plates 36 and 37 to the member 21.

An actuator indicated generally at 29 is located below the lower ends of the legs 23 and 24. Actuator 29 includes a hydraulic cylinder 30 adapted to be attached with suitable hydraulic lines (not shown) to the braking mechanism of the vehicle 10.

Actuator 29 is preferably constructed according to the brake actuator assembly disclosed in U.S. Pat. No. 3,180,455. The brake actuator assembly of U.S. Pat. No. 3,180,455 is incorporated into this disclosure. The brake actuator assembly shown in U.S. Pat. No. 3,180,455 has a pair of members that have relative telescopic movement. The first member includes a tubular casing having a front end attached to a mounting plate. The coupling used to attach the assembly to a towing vehicle is secured to the mounting plate. An outer housing surrounds the inner assembly and is attached to the vehicle to be towed. A hydraulic cylinder located within the assembly has one end attached to the outer housing and the opposite end attached to the inner housing so that on relative movement between the housings the hydraulic cylinder actuates the brake system for the vehicle. Other types of actuators can be used in the hitch assembly of this invention. The actuator 29 can be replaced with a rigid beam. For example, plates 57 and 58 can be secured to the sides of beam 31.

Actuator 29 has a tubular housing 31 located about hydraulic cylinder 30. Housing 31 has a pair of upright ears 32 and 33 secured to the top forward portion of the housing. A transverse bolt 34 pivotally connects the lower ends of side plates 26 and 27 to the ears to pivotally connect the leg 23 to actuator 29. The rear section of housing 31 has upright ears 39 pivotally connected to the lower ends of side plates 36 and 37 the transverse a bolt or pivot member 41.

A rearwardly directed rib or projection 42 is secured to the lower end of back 35. The projection 42 is aligned with or in the same plane with a second rib or projection 43 secured to the lower bottom side of member 21. An expandable and contractable control member indicated generally at 44 is operatively connected to the projections 42 and 43. Control member 44 is a screw jack device having a first yoke 45 pivotally connected with a pin 46 to the projection 42. A second yoke 47 is pivotally connected to projection 43 with a pin 48. A treaded sleeves 49 carry treaded rods 51 and 52 attached to the yokes 45 and 47 respectively. A collar 53 is attached to the sleeves 49. An outwardly directed handle 54 is attached to collar 53. The handle 54 is used to rotate the sleeves 49 thereby adjust the length of the control member 44.

As shown in FIG. 1 in full lines when the control member 44 is in the contracted position the legs 23 and 24 are in a vertical position. When the control member 44 is in its extended position, as shown in broken lines, the legs 23 and 24 extend in a forward direction and hold the hitch connection at an elevated position so that it can be connected with a suitable ball or other connector mounted on the bed 17 of the body 16.

The actuator 29 has a movable member 56 operably connected to the hydraulic cylinder 30 so that on relative movement between the member 56 and the housing 31 the actuator operates to selectively apply or release the breaking force on the brake system for the vehicle 10. A pair of downwardly directed plates 57 and 58, shown in FIG. 3, are connected to the forward end of member 56. The plates 57 and 58 are attached to a connector or coupling unit 59, such as a socket for receiving a ball. Other types of connectors can be used to attach the hitch assembly to a towing vehicle or power unit. Secured to and extended laterally from the back side of the plates 57 or 58 are loop members 61 for accommodating safety chains (not shown) used to connect the hitch assembly 10 to the power unit 11 or towing vehicle.

In use, as shown in FIG. 1, the hitch assembly 14 connects the vehicle 10 with the power unit 11. The control member 44 is shown in full lines in a retracted position. This locates the connector 59 in a low position so that it can be attached to a ball or other type of connector located at a relatively low elevation period for example the ball connector could be on a conventional drawbar of an agricultural tractor. The hitch assembly 10 being in its low position, as shown in full lines in FIG. 1, is being adapted to connect to a tractor drawbar without altering the elevation of the drawbar or changing the generally horizontal position of the members 21 and the frame 12 of vehicle 10.

The elevation of the hitch connector 59 of the hitch assembly 14 is raised by extending the length of the control member 44. The handle 54 is operated to rotate the sleeves 49 and thereby extend the length of the control member. The collar 53 is a ratchet member which allows reciprocal movement of the handle 54 to change the effective length of the control member 44. The relative movement between the members 56 and housing 31 of the actuator permits the actuator to apply the brakes for the vehicle 10 automatically when the speed of the vehicle 10 becomes greater than the speed of the power unit 11 such as when the power unit and vehicle are moving downhill or when the power unit 11 is being braked. The actuator 29 releases the brake when a forward force is applied to the member 56 such as in a towing situation.

While there have been shown and described a preferred embodiment of the invention it is understood that changes in the hitch assembly, brake actuator and control member and other parts can be made by those skilled in the art without departing from the invention. The invention is defined in the following claims.

The embodiments of the invention in which an exclusive property or privilege is claimed are defined as follows:

1. A hitch assembly for coupling an apparatus having a braking system to a towing unit having a pulling member comprising: a forwardly directed tongue member attached to the apparatus, a first link having an upper and lower end, a second link having an upper end and lower end, first pivot means connecting the upper ends of the first link and second link to the tongue member, brake actuator means for controlling the braking system of the apparatus, said brake actuator means having a housing and a connector adapted to attach to the pulling member, means mounting the connector on the brake actuator means and locating the connector below the brake actuator means, second pivot means connecting the lower ends of the first link and second link to the housing, and expandable and contractable control means connected to the lower end of the first link and the tongue member, said control means operable to change the elevation of the housing and connector whereby the hitch assembly can accommodate towing unit pulling members located at different elevations, said tongue member, first link, second link, brake actuator means and control means being located in the same generally upright plane.

2. The hitch assembly of claim 1 including: a first rib secured to the lower side of the tongue member and a second rib secured to the lower end of the first link, said control means being pivotally connected to said first and second ribs.

3. The hitch assembly of claim 2 wherein: the expandable and contractable control means comprise first and second means having cooperating screw threads operable upon relative movement between the first and second means to change the length of the control means.

4. The hitch assembly of claim 1 wherein: the expandable and contractable control means comprise first and second means having cooperating screw threads operable upon relative movement between the first and second means to change the length of the control means.

5. The hitch assembly of claim 1 wherein: the brake actuator means includes a hydraulic cylinder.

6. A hitch assembly for coupling an apparatus to a towing unit having a pulling member comprising: forwardly directed tongue means connected to the apparatus, a rigid member located below the tongue means, a connector adapted to attach to the pulling member, means mounting the connector on the rigid member and locating the connector below the rigid member, downwardly directed link means connecting the tongue means and the rigid member, first pivot means connecting the upper end of the link means to the tongue means, second pivot means connecting the lower end of the link means to the rigid member, and expandable and contractable control means connected to the link means and tongue means to change the elevation of the rigid member whereby the hitch assembly can accommodate towing unit members located at different elevations, said tongue means, rigid member, connector, link means and control means being located in the same generally upright plane.

7. The hitch assembly of claim 6 wherein: the link means comprise a plurality of separate links.

8. The hitch assembly of claim 6 wherein: the means mounting the connector on the rigid member includes brake actuating means for the brakes of the apparatus.

9. The hitch assembly of claim 6 wherein: the expandable and contractable control means comprise first and second means having cooperating screw threads operable upon relative movement between the first and second means to change the length of the control means.

10. The hitch assembly of claim 6 including: a first rib secured to the lower side of the tongue means and a second rib secured to the lower end of the link means, said control means being pivotally connected to said first and second ribs.

11. The hitch assembly of claim 6 wherein: the link means comprise a pair of separate downwardly extended links.

* * * * *